US00RE38226E

(19) United States
(12) Reissued Patent
Sugie et al.

(10) Patent Number: US RE38,226 E
(45) Date of Reissued Patent: Aug. 19, 2003

(54) OPTICAL DISK DRIVER AND OPERATIONAL PROCESSING APPARATUS HAVING SUCH OPTICAL DISK DRIVER

(76) Inventors: Noboru Sugie, c/o Mitsumi Electric Co., Ltd., 8-8-2, Kokuryo-cho, Chofu-shi, Tokyo (JP); Kenichi Furukawa, c/o Mitsumi Electric Co., Ltd., Atsugi Operations Base, 1601, Sakai, Atsugi-shi, Kanagawa (JP); Makoto Ogawa, c/o Mitsumi Electric Co., Ltd., Atsugi Operations Base, 1601, Sakai, Atsugi-shi, Kanagawa (JP); Hironori Kurisu, c/o Mitsumi Electric Co., Ltd., Atsugi Operations Base, 1601, Sakai, Atsugi-shi, Kanagawa (JP); Tomonori Mitsui, c/o Mitsumi Electric Co., Ltd., Atsugi Operations Base, 1601, Sakai, Atsugi-shi, Kanagawa (JP); Akio Saito, c/o Mitsumi Electric Co., Ltd., Atsugi Operations Base, 1601, Sakai, Atsugi-shi, Kanagawa (JP); Mitsunori Nakamura, c/o Mitsumi Electric Co., Ltd., Atsugi Operations Base, 1601, Sakai, Atsugi-shi, Kanagawa (JP); Hiroshi Mochizuki, c/o Mitsumi Electric Co., Ltd., Atsugi Operations Base, 1601, Sakai, Atsugi-shi, Kanagawa (JP)

(21) Appl. No.: 09/286,367

(22) Filed: Apr. 2, 1999

Related U.S. Patent Documents

Reissue of:
(64) Patent No.: 5,181,197
Issued: Jan. 19, 1993
Appl. No.: 07/647,731
Filed: Jan. 28, 1991

(30) Foreign Application Priority Data

| | | |
|---|---|---|
| Jan. 31, 1990 | (JP) | 2-8891 U |
| Jul. 27, 1990 | (JP) | 2-80192 U |
| Jul. 30, 1990 | (JP) | 2-80919 U |
| Jul. 31, 1990 | (JP) | 2-81188 U |

(51) Int. Cl.[7] ..... G11B 3/10; G11B 17/04
(52) U.S. Cl. ..... 369/75.1; 369/75.2; 369/13
(58) Field of Search ..... 369/13, 75.1, 75.2, 369/77.1, 77.2; 360/99.02, 99.03, 99.06, 99.07

(56) References Cited

U.S. PATENT DOCUMENTS

| | | | | |
|---|---|---|---|---|
| 4,661,940 | A | 4/1987 | Camerik | 369/75.2 |
| 4,688,695 | A | 8/1987 | Hirohata | 369/75.2 |
| 4,715,025 | A | 12/1987 | Eijsermans | 369/75.2 |
| 4,794,583 | A | 12/1988 | Funabashi et al. | 369/75.2 |
| 4,799,209 | A | 1/1989 | Grobben | 369/75.2 |
| 4,811,314 | A | 3/1989 | Alves | 369/75.2 |
| 4,829,504 | A | 5/1989 | Sunaga et al. | 369/77.2 |

FOREIGN PATENT DOCUMENTS

| | | |
|---|---|---|
| JP | 58-81763 | 6/1983 |
| JP | 64-23746 | 2/1989 |

*Primary Examiner*—Brian E. Miller
(74) *Attorney, Agent, or Firm*—Patents+TMS, P.C.

(57) ABSTRACT

An optical disk driver using a top-loading mechanism is coupled to an operational processor, such as a personal computer. The term "a top-loading mechanism" means a mechanism for inserting and/or ejecting an optical disk via a top surface of the optical disk driver. Additionally, a display unit used for the operational processor can be located on an operational processing apparatus comprising such an optical disk driver and an operational processor. The optical disk driver includes a first case (12), accommodated in a housing (10a) having the operational processor therein, a second case (11); movable from a first position to a second position, the second case (11) projecting from the first case (12) so that an optical disk can be inserted and/or ejected via a top surface of the second case (11) when the second case being located at the first position, the second case being accommodated in the first case to be operatively connected to the operational processor when the second case (11) being located at the second position.

16 Claims, 10 Drawing Sheets

OPTICAL DISK DRIVER AND OPERATIONAL PROCESSING APPARATUS HAVING SUCH OPTICAL DISK DRIVER

Matter enclosed in heavy brackets [ ] appears in the original patent but forms no part of this reissue specification; matter printed in italics indicates the additions made by reissue.

BACKGROUND OF THE INVENTION

The present invention relates generally to optical disk drivers which drives optical disks (generally called CD-ROMs) and operational processing apparatuses having such optical disk drivers therein, and more particularly to an optical disk driver using a top-loading mechanism and an operational processing apparatus having such an optical disk driver therein. The term "a top-loading mechanism", as used herein, means a mechanism for inserting and/or ejecting an optical disk via a top surface of the optical disk driver. And the term "an operational processing apparatus", as used herein, means an apparatus having an operational processor, such as a personal computer, and a CD-ROM driver.

FIGS. 1 to 3 shows example of different types of CD-ROM drivers. FIG. 1 shows a CD-ROM driver using the top-loading mechanism separated from a personal computer. FIG. 2 shows a CD-ROM driver having the top-loading mechanism united with a personal computer. FIG. 3 shows a CD-ROM driver having a front-loading mechanism united with a personal computer. The term "a front-loading mechanism", as used herein, means a mechanism for inserting and/or ejecting an optical disk from a radial direction thereof via a front surface of the optical disk driver. The numbers 1, 4 and 6 indicate CD-ROM drivers, numbers 2, 5 and 7 indicate personal computers, a number 3 indicates an interface cable, a number 5a indicates a display unit, and a number 8 indicates a CD-ROM, respectively.

However, the above conventional CD-ROM drivers have the following disadvantages:

1. Since the CD-ROM driver 1 in FIG. 1 is coupled to the personal computer 2 via the interface cable 3, a relatively large space is necessary in which to locate the operational processing apparatus;

2. Since the CD-ROM driver 4 in FIG. 2 uses the top-loading mechanism, a display unit 5a cannot be placed on the personal computer 5;

3. Since the CD-ROM driver 6 uses the front-loading mechanism which is more complicated than the top loading mechanism, the cost of the operational processing apparatus becomes more expensive.

SUMMARY OF THE INVENTION

Accordingly, it is a general object of the present invention to provide a novel and useful optical disk driver and an operational processing apparatus having such an optical disk driver in which the above disadvantages are eliminated.

Another object of the present invention is to provide an optical disk driver using a relatively simple loading mechanism, an operational processing apparatus having such an optical disk driver which is relatively small, and on which a display unit can be placed.

A more specific object of the present invention is to provide an optical disk driver which comprises a first case, accommodated in a housing having an operational processor therein, the first case being operatively connected to the operational processor and the first case having an inserting opening, a second case, movable from a first position to a second position, the second case projecting from the first case so that an optical disk can be inserted and/or ejected via a top surface of the second case when the second case is located at the first position, the second case being accommodated in the first case so that the second case is operatively connected to the operational processor via the first case when the second case is located at the second position, and the second case being inserted into the first case and/or projected therefrom via the inserting opening of the first case, and driving means for driving the optical disk inserted into the second case.

Another more specific object of the present invention is to provide an operational processing apparatus which comprises a housing, a operational processor accommodated in said housing, and an optical disk driver comprising a first case, accommodated in said housing, the first case being operatively connected to the operational processor and the first case having an inserting opening, a second case, movable from a first position to a second position, the second case projecting from the first case so that an optical disk can be inserted and/or ejected via a top surface of the second case when the second case is located at the first position, the second case being accommodated in the first case so that the second case is operatively connected to the operational processor via the first case when the second case is located at the second position, and the second case being inserted into the first case and/or projected therefrom via the inserting opening of the first case, and driving means for driving the optical disk inserted into said second case.

According to the present invention, the optical disk driver uses a top-loading mechanism in which an optical disk is inserted and/or ejected via the top surface of the second case. Therefore, the loading mechanism thereof is simpler than that using a front-loading mechanism so that the cost of the operational processing apparatus can be kept inexpensive. Moreover, the optical disk driver is united to the operational processor when the second case is located at the second position so that the operational processing apparatus is located in a relatively small space. Additionally, the first case is accommodated in the housing whereas the optical disk driver uses the top-loading mechanism so that a display unit can be placed on the housing.

Other objects and further features of the present invention will be apparent from the following detailed description when read conjunction with the accompanying drawings.

DESCRIPTION OF THE PREFERRED EMBODIMENTS

Figure 1:
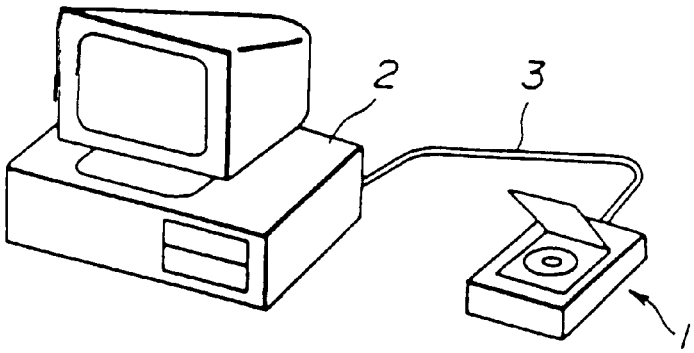
FIG. 1 (PRIOR ART)
FIGS. 1 to 3 are perspective views of conventional CD-ROM drivers.
Figure 2:
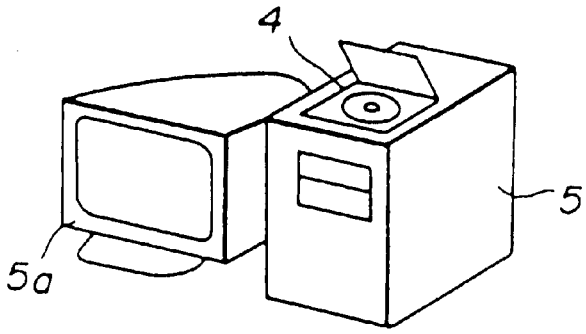
FIG. 2 (PRIOR ART)
Figure 3:
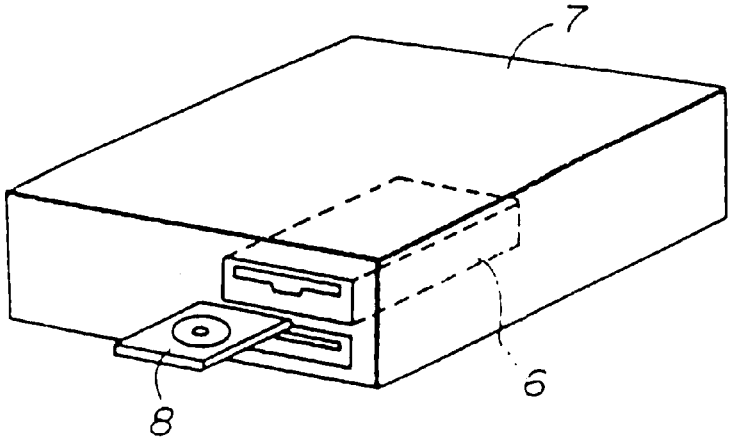
FIG. 3 (PRIOR ART)

A description will now be given of a CD-ROM driver and an operational processing apparatus having such a CD-ROM driver therein of a first embodiment according to the present invention with reference to FIGS. 4 to 6. Same elements will be designated by the same corresponding reference numerals, and the description thereof will be given once.

The operational processing apparatus 10 according to the present invention comprises a housing 10a, a personal computer (not shown) accommodated in the housing 10a, an accommodation case 12 accommodated in the housing, and a CD-ROM driver 11 insertable into the accommodation case 12 and/or projectable therefrom.

The CD-ROM driver 11 drives a CD-ROM 13 when the CD-ROM driver 11 is inserted into the accommodation case 12. Therefore, it may be said that the CD-ROM driver 11 accommodated in the accommodation case 12 corresponds to the CD-ROM driver 1 shown in FIG. 1. The CD-ROM driver 11 is projected from the accommodation case 12 when the CD-ROM 13 is to be inserted into the CD-ROM driver 11 and/or ejected therefrom, and the CD-ROM driver 11 is inserted into the accommodation case 12 when the CD-ROM 13 is to be driven. Since the CD-ROM driver 11 is integrated and electrically connected with the personal computer in the housing 10a via the accommodation case 12, the operational processing apparatus 10 can be located in a relatively small space. Since the CD-ROM driver 11 and the accommodation case 12 are accommodated in the housing 10a, a display unit (not shown) can be placed on the housing 10a. Moreover, the CD-ROM driver 11 uses the top-loading mechanism which is less complicated than the front-loading mechanism so that the cost of the operational processing apparatus is kept inexpensive. A description will now be given of the operation of the CD-ROM driver 11.

Figure 4:
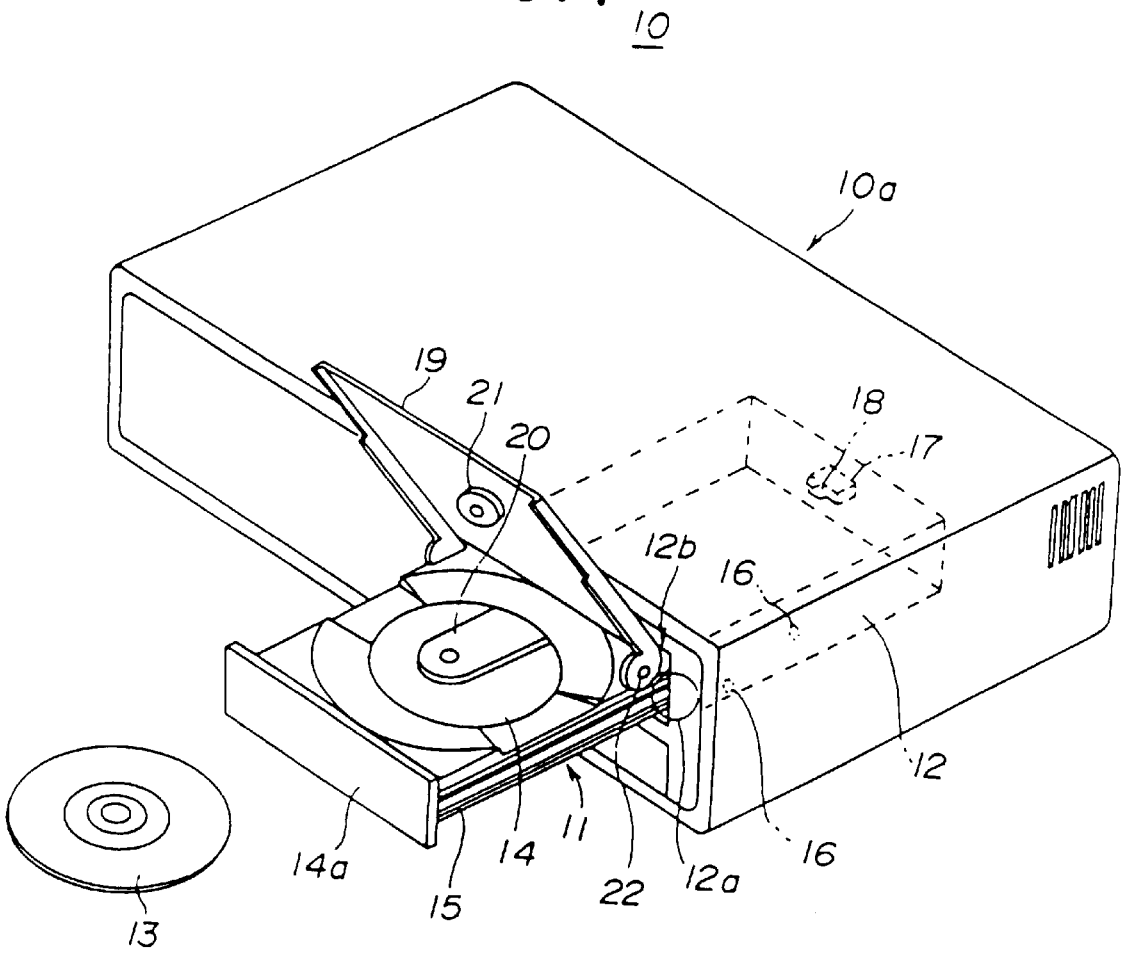
FIG. 4 is a perspective view of an operational processing apparatus of a first embodiment according to the present invention.
Figure 5:
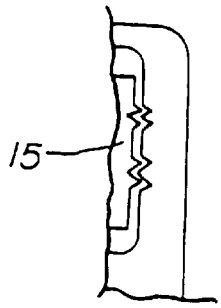
FIG. 5 is an enlarged view of an operational processing apparatus of a second embodiment according to the present invention, which enlarged view corresponds to the vicinity of an engagement part in FIG. 4.

As shown in FIG. 4, the CD-ROM driver 11 is located at a first position where the CD-ROM 11 driver is projected from the accommodation case 12 when the CD-ROM 13 is to be inserted into the CD-ROM driver 11 and/or ejected therefrom. On the other hand, the CD-ROM driver 11 is located at a second position where the CD-ROM driver 11 is inserted into the accommodation case 12 when the CD-ROM 13 is to be driven. The CD-ROM driver 11 is movable between the first position and the second position. Incidentally, the CD-ROM driver 11 according to the embodiment has a lid 19 at a top surface thereof, and the CD-ROM 13 is inserted into the CD-ROM driver 11 and/or ejected therefrom via the lid 19. Whether the lid 19 is provided or not is a matter of choice. The lid 19 can be opened and/or closed around an axis 22 by hand. The CD-ROM 13 is placed at a disk table 20 of a driving part 14, and is driven there. After the CD-ROM 13 is placed on the disk table 20 and the lid 19 is closed, then the front part 14a of the driving part 14 is pushed by hand s that the CD-ROM driver 11 is inserted into the accommodation case 12. The CD-ROM 13 is fixed on the disk table 20 by a clamper 21. A description will now be given of the movement between the first position and the second position of the CD-ROM driver 11.

The CD-ROM driver 11 moves with a rail 15 mounted on a side surface thereof. The accommodation case 12 has rollers 16 which determine a path of the rail 15. The rollers 16 hold and support the rail 15 from the top and the bottom so that the path of the rail 15 is positioned by the rollers 16. The CD-ROM driver 11 can slide between the first position and the second position by the guidance of the rail 15 and the rollers 16. The number and the location of the roller 16 can be changable. Incidentally, the path of the rail 15 may be determined, not by the rollers 16, but by a section at an engagement part 12a of the accommodation case 12 which is engagable with the rail 15, as shown in FIG. 5. The CD-ROM driver 11 is inserted into the accommodation case 12 and/or projected therefrom via an insertion opening 12b.

Figure 6:
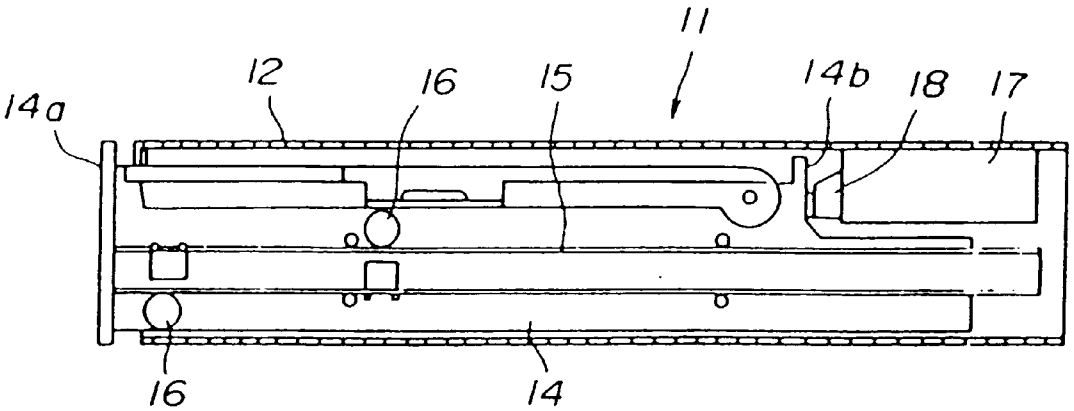
FIG. 6 is a cross-sectional view of the operational processing apparatus shown in FIG. 4 into which a CD-ROM can be inserted.
Figure 7:
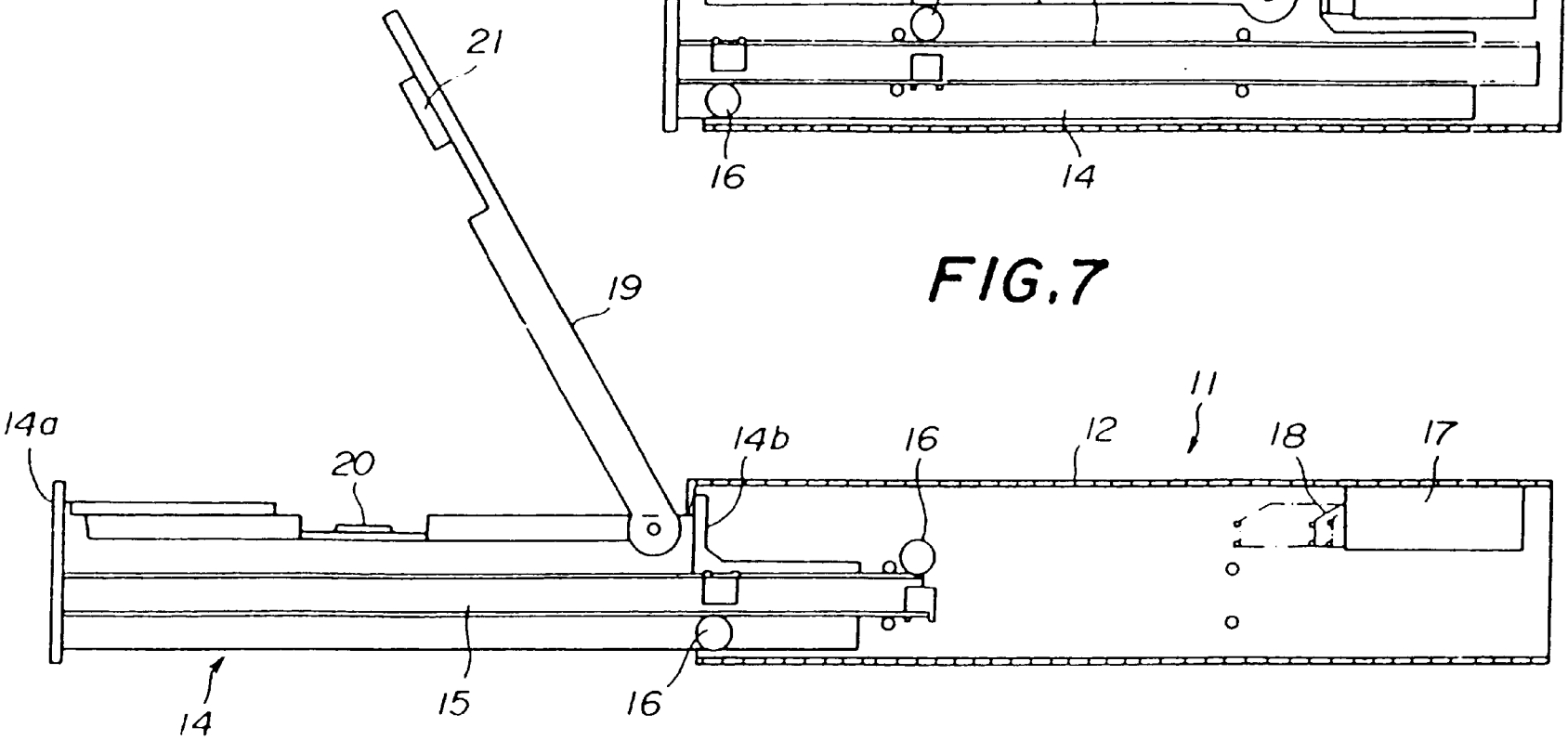
FIG. 7 is a cross-sectional view of the operational processing apparatus shown in FIG. 4 from which a CD-ROM has been ejected.

The CD-ROM driver 11 is attracted to a magnet rod 18 when the CD-ROM driver 11 is moved to the second position, as shown in FIG. 6. The magnet rod 18 is fixed to the accommodation case 12 via the magnet supporter 17. The magnet rod 18 magnetically fixes the CD-ROM driver 11 to protect it from the inclination of the housing 10a and the external vibration. The CD-ROM driver 11 can be moved from the second position to the first position by further pushing the front part 14a. As shown in FIG. 7, the magnet rod 18 is fixed to the magnet supporter by a latch mechanism. The fixation by the latch mechanism is released by further pushing the magnet rod 18. Therefore, if the front part 14a is further pushed while the CD-ROM driver 11 is located at the second position, the magnet rod 18 is released from the fixation so that it is projected forward, consequently, the CD-ROM driver 11 is also projected from the accommodation case 12. Then the CD-ROM driver 11 may be moved to the first position by hand.

It is possible to move the CD-ROM driver automatically from the second position to the first position, and thus open the lid in synchronization with the release of the latch mechanism. A description will now be given of an operational processing apparatus of a third embodiment according to the present invention with reference to FIGS. 8 to 10. The operational processing apparatus 30 of the embodiment comprises a projection mechanism 34, a spring 27 which forces a lid 28 in an opening direction (direction A), a lock mechanism 23, and a lock release mechanism 40. In this embodiment, the lid 28 has a hook 26. The hook 26 is engagable with the lock mechanism 23 to lock the lid 28 in order to keep the lid closed. The spring 27 is engaged with the axis 22.

The projection mechanism 34 is a mechanism for automatically moving the CD-ROM driver 29 from the second position to the first position in synchronization with the release of the latch mechanism. The projection mechanism 34 comprises a pin 31 mounted on the side surface 29a of the CD-ROM driver 29, a pin 32 mounted on the accommodation case 12, and tension coiled spring 33 stretched between the pins 31 and 32. The strength of the spring 33 is adjustable by changing the location of the pins 31 and 32. Thus, the CD-ROM driver 29 is forced in the direction $X_2$ as it is moved from the second position to the first position. The projection mechanism 34 may comprise the pin 31 mounted on the accommodation case 12, the pin 32 mounted on the side surface 29a, and compression coiled spring stretched therebetween. In addition, a mechanism for reeling a wire by a spring like take-up reel may be applicable to the projection mechanism 34 instead of the using a coiled spring. Moreover, another mechanism may be used for the projection mechanism 34 as long as it forces the CD-ROM driver 29 in the direction $X_2$ as it is moved from the second position to the first position.

The lock mechanism 23 is a mechanism for locking the lid 28 by cooperating with the hook 26. The lock mechanism 23 comprises a hook lever 24 to engage with the hook 26 and a spring 25 forcing the hook lever 24 in an engagement direction. In this embodiment, since the engagement direction corresponds to a clockwise direction, the spring 25 forces the hook lever 24 clockwise via a pin 35.

Figure 10:
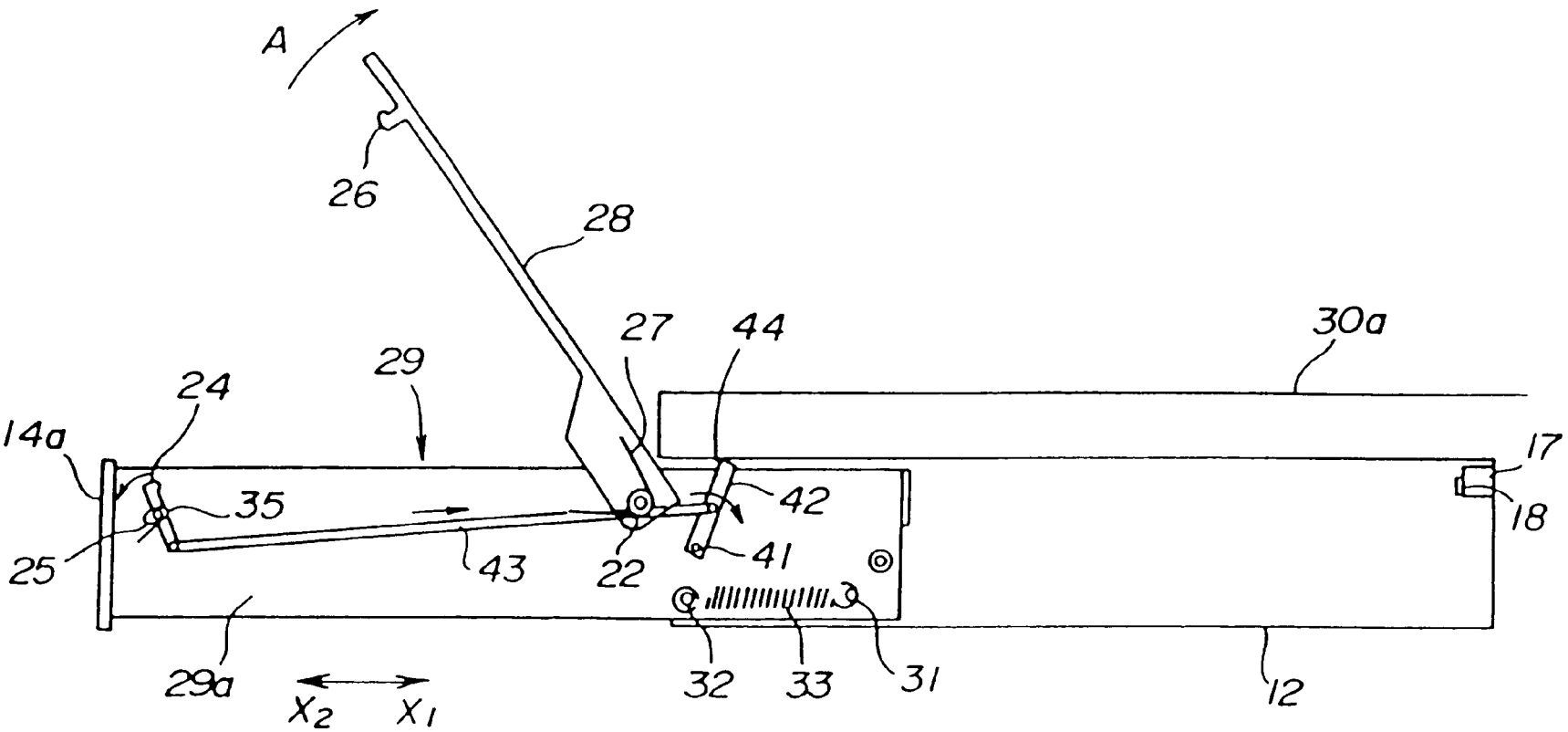
FIG. 10 is a cross-sectional view of the CD-ROM driver shown in FIG. 8 from which a CD-ROM has been ejected.

The lock release mechanism 40 is a mechanism for releasing the lock of the lock mechanism 23. The lock mechanism 40 comprises a projection 44 projecting from the accommodation case 12 in the vicinity of the insertion opening 12b, a lever 42 mounted on the side surface 29a via a pin 41, and a connection rod 43 connecting the lever 42 to the hook lever 24. The lever 42 engages with the projection 44 when the CD-ROM driver 29 is approximately moved to the first position. When the lever 42 engages with the projection 44, as shown in FIG. 10, the lever 42 rotates clockwise. Thus, the lever 42 rotates the hook lever 24 counterclockwise via the connection rod 43 so that the lock of the lock mechanism 23 is released.

Figure 9:
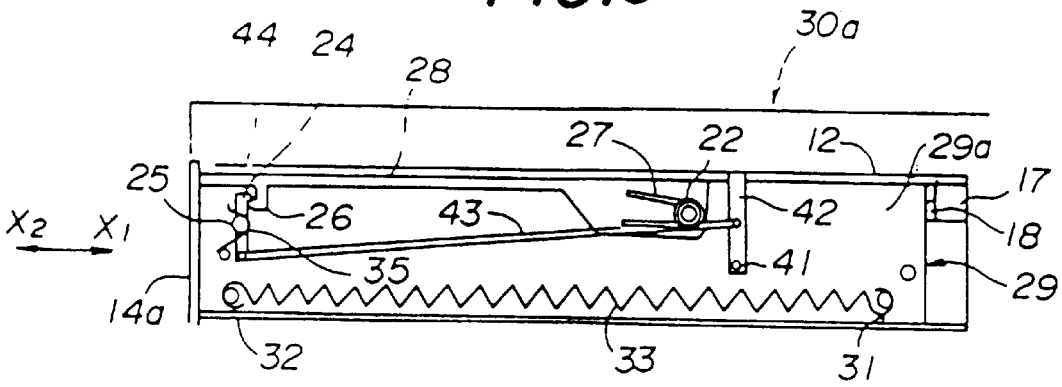
FIG. 9 is a cross-sectional view of a CD-ROM driver shown in FIG. 8 in which a CD-ROM can be inserted.

Accordingly, when the CD-ROM driver 29 is located at the second position shown in FIG. 9, the lid 28 is locked by the engagement of the hook 26 and the hook lever 24. And the CD-ROM driver 29 is forced in the direction $X_2$ by the spring 33. When the front part 14a is pushed in a direction $X_1$, the fixation of the magnet supporter 17 is released. Thus, the CD-ROM driver 29 is moved in the direction $X_2$ by the spring 33 until the lever 42 engages with the projection 44. The engagement of the lever 42 and the projection 44 releases the lock of the lock mechanism 23. The the lid 28 is opened by the spring 27 in synchronization with the releasing of the lock.

Therefore, the pushing of the front part 14a moves the CD-ROM driver 29 automatically from the second position to the first position, and opens the lid 28 automatically, too. Incidentally, the lid 28 has a bumper (not shown) so that the lid 28 is opened and/or closed softly. Whether the bumper is provided or not is a matter of choice.

It is possible to open and/or close the lid automatically in synchronization with the movement of the CD-ROM driver. A description will now be given of a CD-ROM driver of a fourth embodiment according to the present invention. In this embodiment, the lid 37 is forced in the opening direction by the spring 27, as in the third embodiment. And the lid 37 is smoothly closed by rollers 38 in synchronization with the movement of the CD-ROM driver 36 from the first position to the second position. The lid 37 has an engagement portion 37a into which two rollers 38 located in the accommodation case 12 are inserted to be engaged therewith. A plurality of bearings may be provided in the vicinity of the insertion opening 12b of the accommodation case 12.

Figure 8:
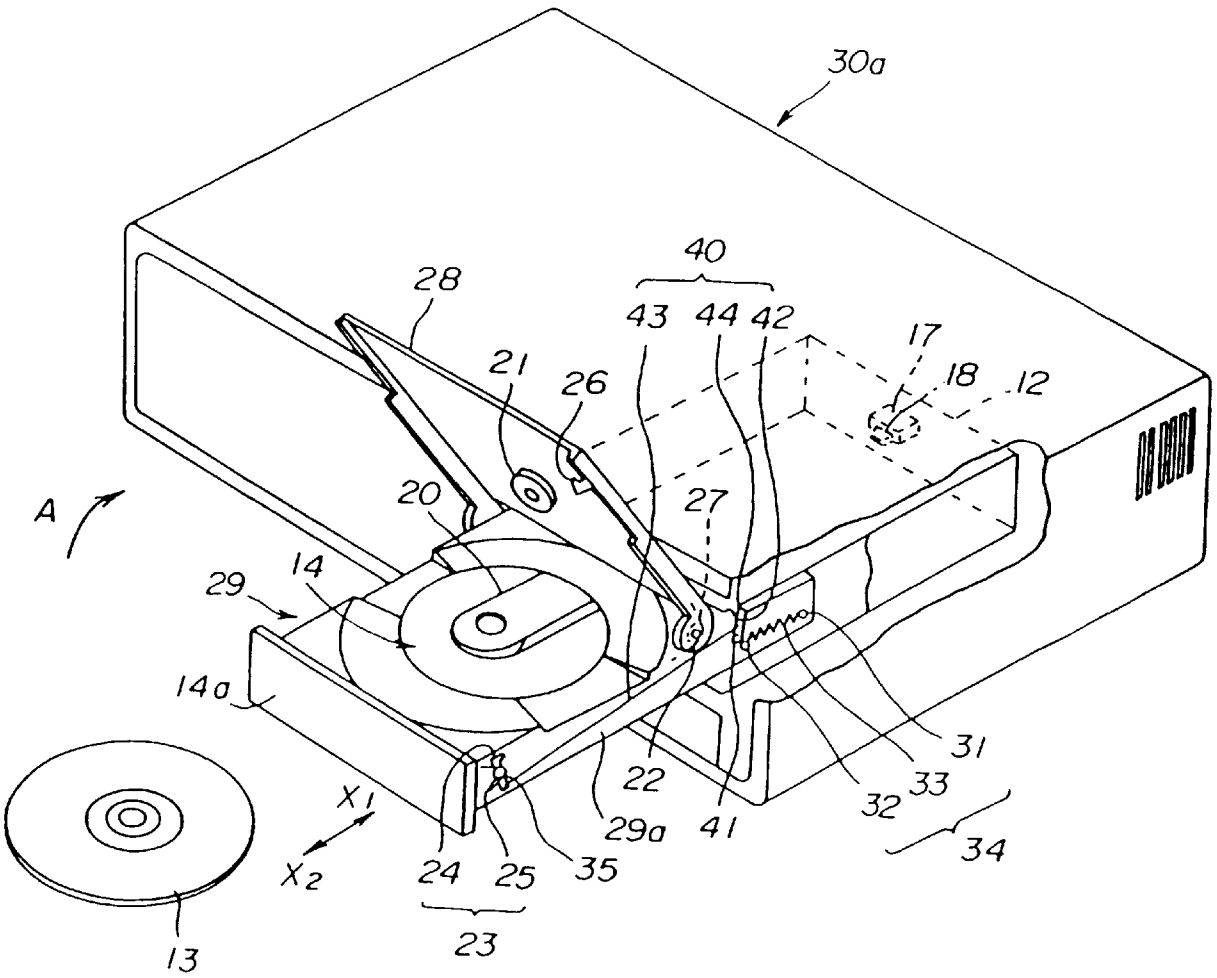
FIG. 8 is a perspective view of an operational processing apparatus of a third embodiment according to the present invention.
Figure 11:
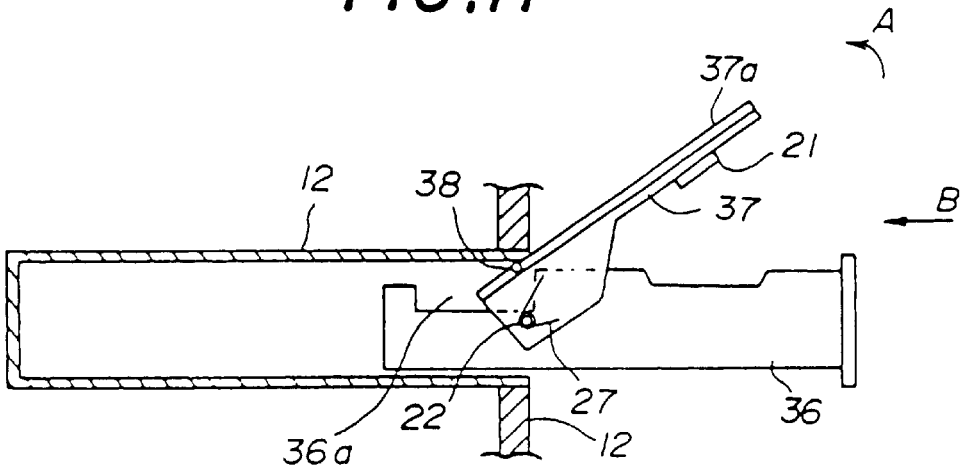
FIG. 11 is a cross-sectional view of a CD-ROM driver of a fourth embodiment according to the present invention.
Figure 12:
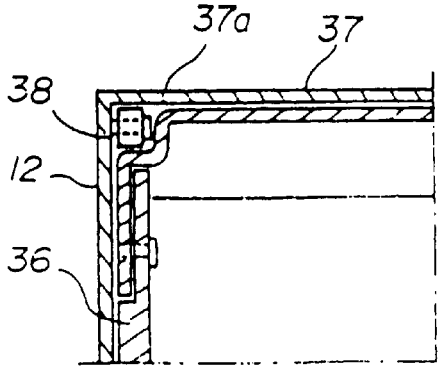
FIG. 12 is a cross-sectional view of a CD-ROM driver with a lid closed viewed from a direction B shown in FIG. 11.

FIG. 12 is an enlarged view of a part of the CD-ROM driver 36 with a lid 37 closed viewed from the direction B shown in FIG. 11. Each of the rollers 38 is provided in the vicinity of the insertion opening 12b. Therefore, the lid 37 gets smoothly closed by the engagement of the lid 37 with the rollers 38 as the CD-ROM driver 36 moves from the first position to the second position. Incidentally, whether the spring 27 is provided or not is a matter of choice. If the spring 27 is not provided, only the automatic closing of the lid is possible. The CD-ROM diver 36 has a concave part 36a, as shown in FIG. 8, which functions as an opening and/or closing space for the lid 37.

Figure 13:
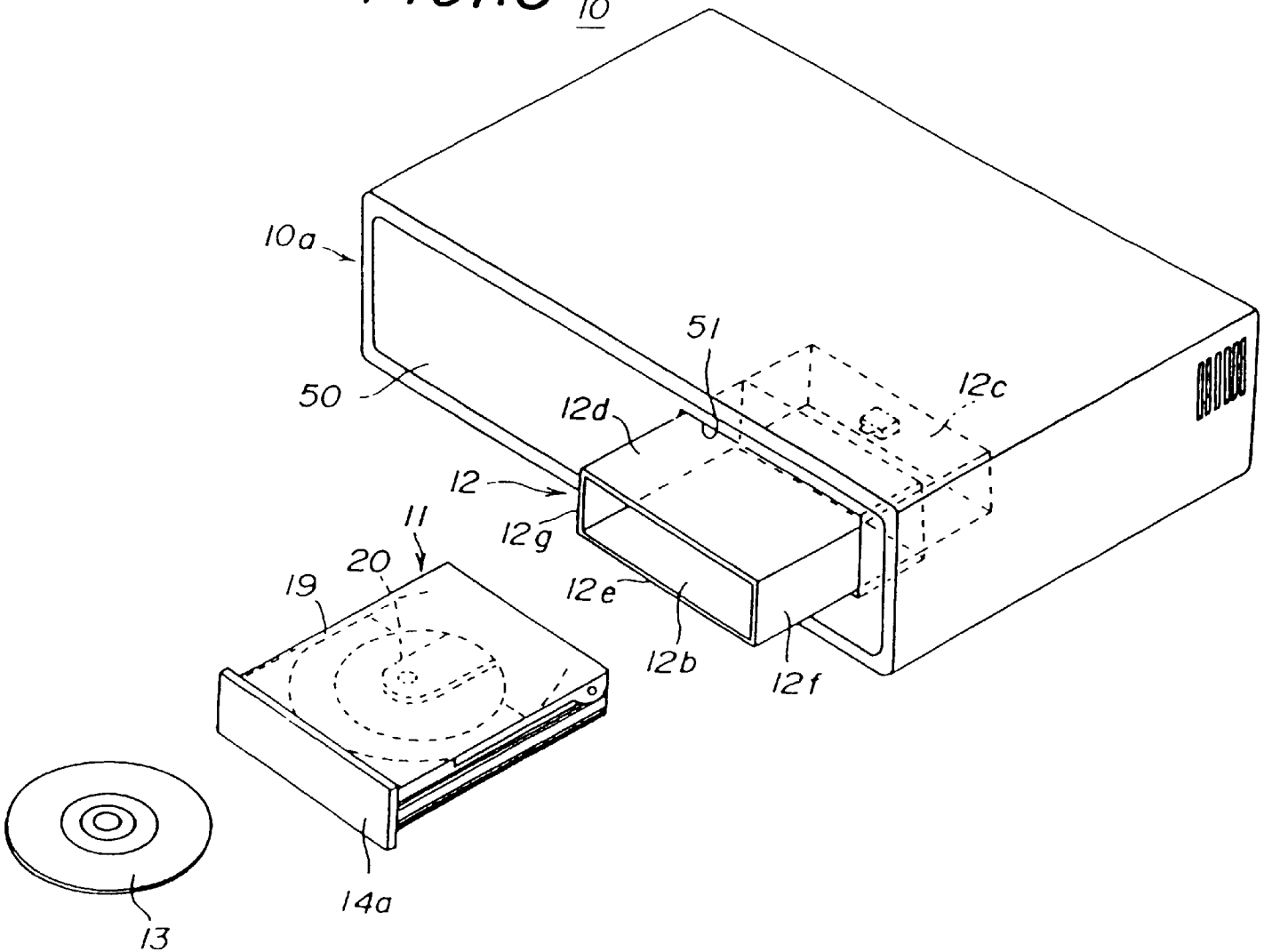
FIG. 13 is a view for explaining an accommodation case shown in FIG. 4.

The accommodation case 12 in FIG. 4 comprises, as shown in FIG. 13, a back surface 12c having the magnet supporter 17 thereon fixed in the housing 10a, a top surface 12d, a bottom surface 12e, and side surfaces 12f and 12g which can be inserted and/or ejected via an mouth 51 of the housing 10a. It is desirable to position the insertion opening 12b of the accommodation case 12 at the center of the mouth 51. Accordingly, the present invention also provides a positioning member which positions the insertion opening 12b at the center of the mouth 51.

A description will be given of a CD-ROM driver of a fifth embodiment according to the present invention with reference to FIGS. 14 to 19. In this embodiment, the accommodation case 12 comprises positioning members 52 and 53 in the vicinity of the insertion opening 12b. Because of the positioning members 52 and 53, the accommodation case 12 can be adequately engaged with the mouth 51 in the vicinity of the insertion opening 12b so that the insertion opening 12b is located at the center of the mouth 51.

Figure 14:
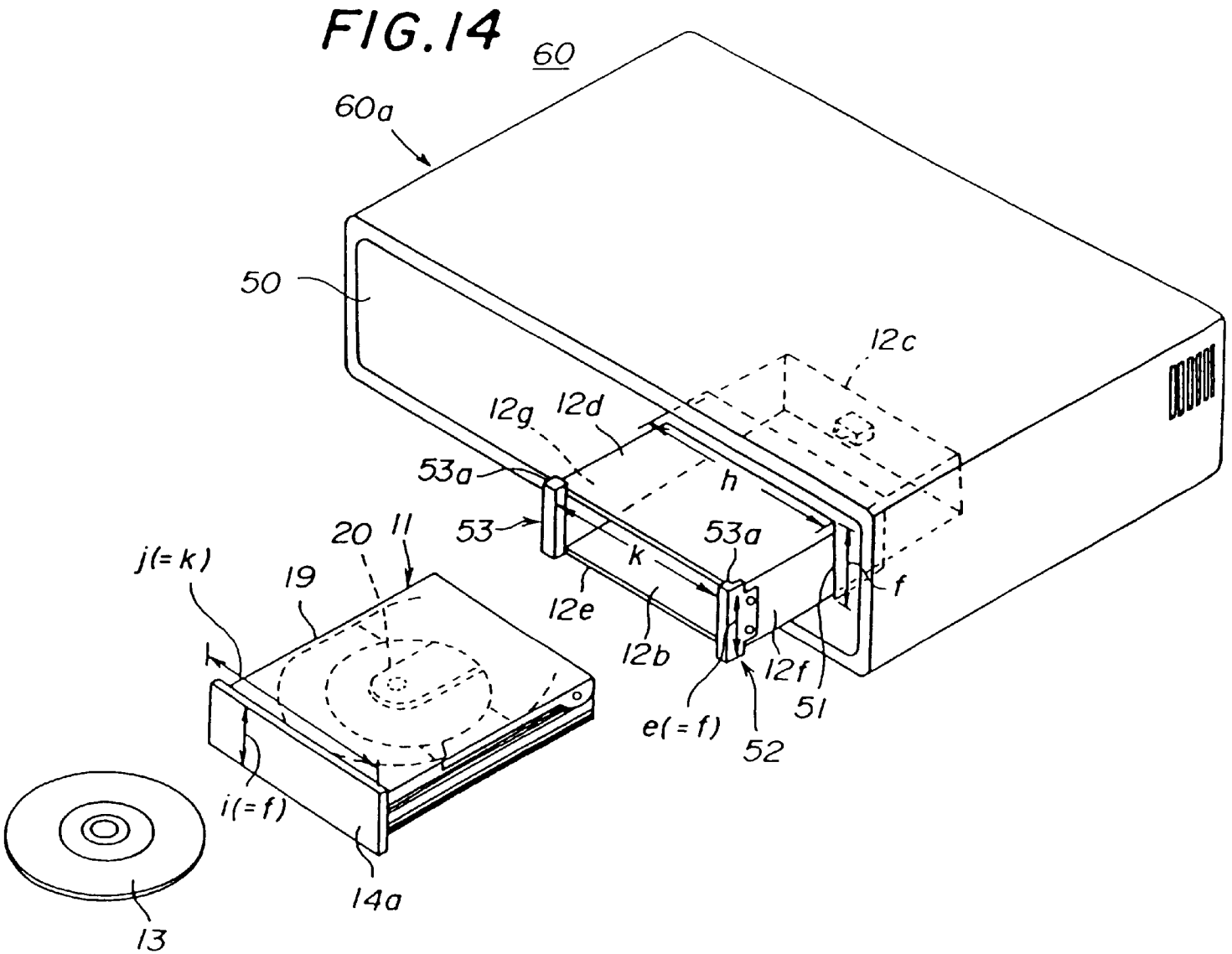
FIGS. 14 to 19 are views for explaining an operational processing apparatus of a fifth embodiment according to the present invention.
Figure 15:
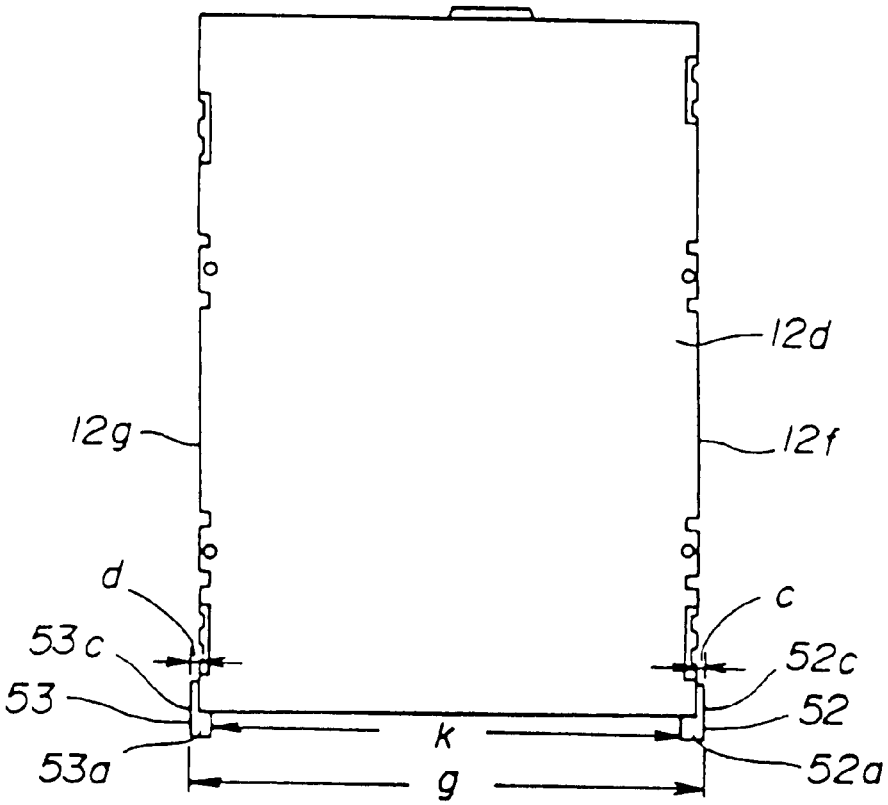
Figure 16:
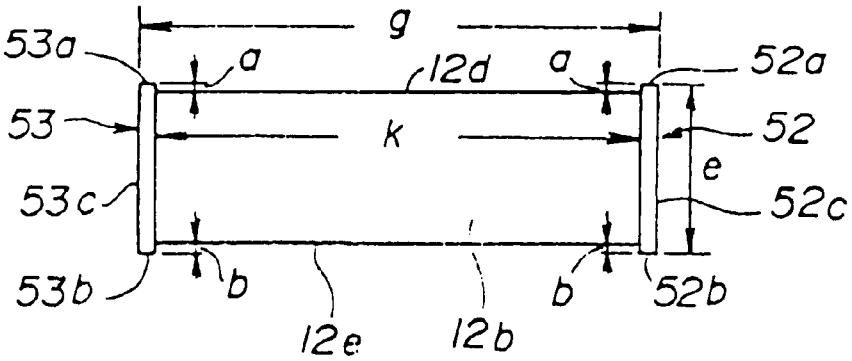
Figure 17:
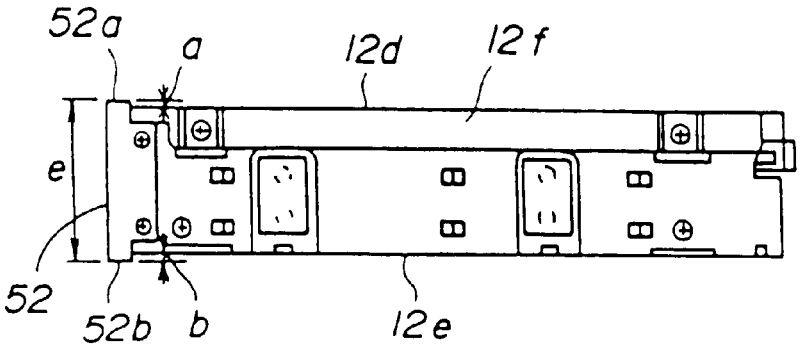

FIG. 14 shows a CD-ROM driver 60 of the fifth embodiment according to the present invention. The positioning members 52 and 53 have square pillar shapes made of synthetic resin, respectively, top surfaces which project from the top surface 12d by "a", bottom surfaces which project from the bottom surface 12e by "b", side surfaces which project respectively from the side surfaces 12f and 12g by "c" and by "d", as shown in FIGS. 15 to 17. The spans "e" of the positioning members 52 and 53 are equal to the height "f" of the mouth 51 and the height "i" of the front part 14a. The distance "g" between the side surfaces 52c and 53c is equal to the width "h" of of the mouth 51. The width "j" of the front part 14a is equal to the distance "k" between the top surfaces 52a and 53a.

Figure 18:
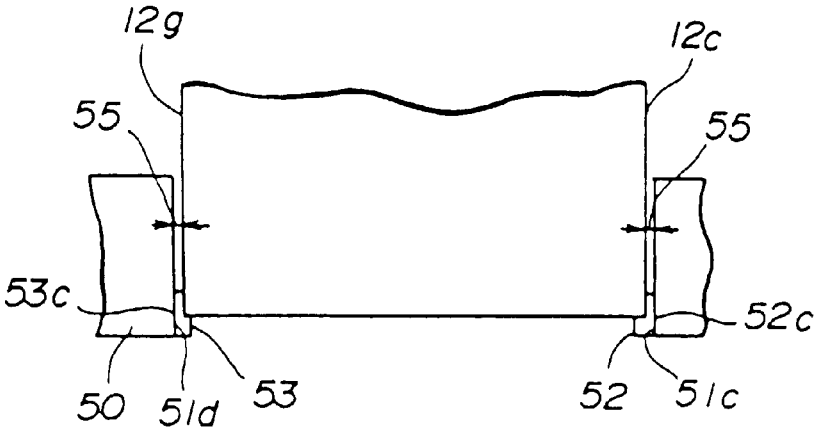
Figure 19:
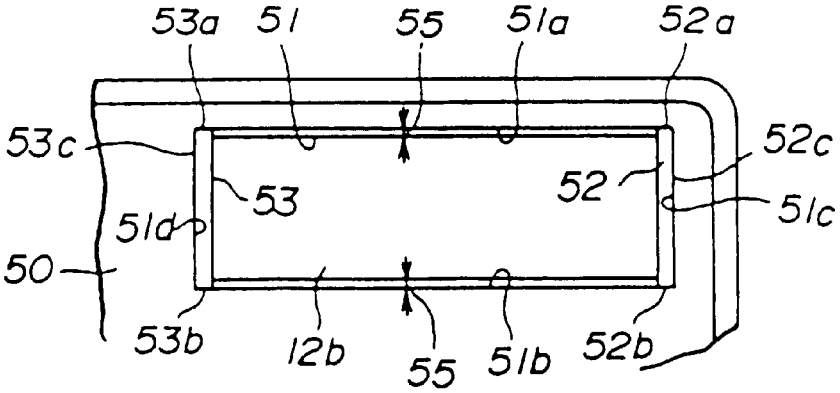

FIGS. 18 and 19 show the accommodation case 12 accommodated in the housing 60a. The top surfaces 52a and 53a make contact with the top surface 51a of the mouth 51, the bottom surfaces 52b and 53b make contact with the bottom surface 51b thereof, side surfaces 52c and 53c contact with the side surfaces 51c and 51d thereof, respectively. Thus, the aperture 55 between the accommodation case 12 and the housing 10a is uniformized so that the insertion opening 16 is positioned at the center of the mouth 51.

Further, the present invention is not limited to these embodiments, but various variations and modifications may be made without departing from the scope of the present invention.

What is claimed is:

1. An optical disk driver comprising:

a first case, accommodated in a housing which includes therein an operational processor operatively connected to said first case, said housing having a mouth via which said first case is inserted into the housing and ejected therefrom, said first case including an insertion opening having a shape corresponding to the mouth, there being an aperture between the first case and the mouth;

a second case, movable from a first position to a second position, said second case projecting from the first case so that an optical disk can be inserted and ejected via a top surface of said second case when said second case is located at the first position, said second case being operatively connected to the operational processor via said first case when said second case is located at the second position, said second case being inserted into said first case and projected therefrom via the insertion opening of said first case, said second case having a lid at a top surface thereof, the lid opening when said second case is located at the first position so that the optical disk can be inserted into said second case and ejected therefrom, and the lid being closed when said second case is located at the second position;

driving means for driving the optical disk inserted into said second case;

moving means for moving said second case from the second position to the first position;

opening means for opening the lid;

lock means for locking the lid in order to keep the lid closed; and lock release means coupled to said lock means for releasing the lock of said lock means, said lock release means releasing the lock of said lock means, and the opening means opening the lid in response to the movement of said second case from the second position to the first position, wherein said first case comprises:

a pair of positioning members, oppositely located around the insertion opening, which are respectively inserted into a part of the aperture in order to position the insertion opening of the first case at substantially the center of the mouth when said first case is inserted into the housing, and fixing means for removably fixing the second case in the first case when the second case is located at the second position, and wherein said lock means further comprises:

a hook provided on the lid;

a hook lever, mounted on said second case, engageable with the hook when the lid is closed; and a spring, mounted on said second case, which forces the hook lever in a direction in which the hook lever engages with the hook, the lid being kept closed while the hook and the hook lever are engaged with each other, and wherein said lock release means further comprises:

a connection member connected to the hook lever;

moving detection means for detecting whether or not said second case has moved to approximately the first position; and engagement release means for forcing the connecting member in a direction such that the hook is released from being engaged with the hook lever when the moving detection means detects that said second case has moved to approximately the first position.

2. An optical disk driver comprising:

a first case, accommodated in a housing which includes therein an operational processor operatively connected to said first case, said housing having a mouth via which said first case is inserted into the housing and ejected therefrom, said first case including an insertion opening having a shape corresponding to the mouth, there being an aperture between the first case and the mouth;

a second case, movable from a first position to a second position, said second case projecting from the first case so that an optical disk can be inserted and ejected via a top surface of said second case when said second case is located at the first position, said second case being operatively connected to the operational processor via said first case when said second case is located at the second position, said second case being inserted into said first case and projected therefrom via the insertion opening of said first case, said second case having a lid at the top surface of said second case, the lid opening when said second case is located at the first position so that the optical disk can be inserted into said second case and ejected therefrom, and the lid being closed when said second case is located at the second position;

driving means for driving the optical disk inserted into said second case;

moving means for moving said second case from the second position to the first position;

opening means for opening the lid;

lock means for locking the lid in order to keep the lid closed; and lock release means coupled to said lock means for releasing the lock of said lock means, said lock release means releasing the lock of said lock means, and the opening means opening the lid in response to the movement of said second case from the second position to the first position, wherein said first case comprises:

a pair of positioning members, oppositely located around the insertion opening, which are respectively inserted into a part of the aperture in order to position the insertion opening of the first case at substantially the center of the mouth when said first case is inserted into the housing, and fixing means for removably fixing the second case in the first case when the second case is located at the second position, and wherein said lock means further comprises:

a hook provided on the lid;

a hook lever, mounted on said second case, engagable with the hook when the lid is closed; and a spring, mounted on said second case, which forces the hook lever in a direction in which the hook lever engages with the hook, the lid being kept closed while the hook and the hook lever are engaged with each other, and wherein said lock release means further comprises:

a connection member connected with the hook lever;

moving detection means for detecting whether or not said second case has moved to approximately the first position; and engagement release means for forcing the connection member in a direction such that the hook is released from being engaged with the hook lever when the moving detection means detects that said second case has moved to approximately the first position, and wherein the moving detection means further comprises:

a projection, projecting in the vicinity of the insertion opening of said first case; and an engagement member, located in the vicinity of an edge of said second case, engagable with the projection when said second case is approximately moved to the first position, the engagement release means operatively connecting the engagement member to the connection member, and the engagement release means moving the engagement member to move the connection member in the direction that releases the hook from engagement with the hook lever when the engagement member is engaged with the projection.

3. An optical disk driver comprising:

a first case, accommodated in a housing which includes therein an operational processor operatively connected to said first case, said housing having a mouth via which said first case is inserted into the housing and ejected therefrom, said first case including an insertion opening having a shape corresponding to the mouth, there being an aperture between the first case and the mouth;

a second case, movable from a first position to a second position, said second case projecting from the first case so that an optical disk can be inserted and ejected via a top surface of said second case when said second case is located at the first position, said second case being operatively connected to the operational processor via said first case when said second case is located at the second position, said second case being inserted into said first case and projected therefrom via the insertion opening of said first case, said second case comprising a lid at the top surface thereof, the lid opening when said second case is located at the first position so that the optical disk can be inserted into said second case and ejected therefrom, and the lid being closed when said second case is located at the second position;

driving means for driving the optical disk inserted into said second case; and closing means operable when said second case is moved from the first position to the second position with the lid open, said closing means closing the lid softly, in synchronization with the movement of said second case, wherein said first case comprises:

a pair of positioning members, oppositely located around the insertion opening, which are respectively inserted into a part of the aperture in order to position the insertion opening of said first case at substantially the center of the mouth when said first case is inserted into the housing, and fixing means for removably fixing the second case in the first case when the second case is located at the second position.

4. An optical disk driver comprising:

a first case, accommodated in a housing which includes therein an operational processor operatively connected to said first case, said housing having a mouth via which said first case is inserted into the housing and ejected therefrom, said first case including an insertion opening having a shape corresponding to the mouth, there being an aperture between the first case and the mouth;

a second case, movable from a first position to a second position, said second case projecting from the first case so that an optical disk can be inserted and ejected via a top surface of said second case when said second case is located at the first position, said second case being operatively connected to the operational processor, via said first case, when said second case is located at the second position, said second case being inserted into said first case and projected therefrom via the insertion opening of said first case, said second case comprising a lid at the top surface thereof, the lid opening when said second case is located at the first position so that the optical disk can be inserted into said second case and ejected therefrom, and the lid being closed when said second case is located at the second position;

driving means for driving the optical disk inserted into said second case; and closing means operable when said second case is moved from the first position to the second position with the lid open, said closing means closing the lid softly in synchronization with the movement of said second case, wherein said first case comprises:

a pair of positioning members, oppositely located around the insertion opening, which are respectively inserted into a part of the aperture in order to position the insertion opening of the first case at substantially the center of the mouth when said first case is inserted into the housing, and fixing means for removably fixing the second case in the first case when the second case is located at the second position, and wherein said closing means further comprises:

roller means located in the vicinity of the insertion opening of said first case; and an engagement part, engagable with the roller means, provided on the lid, the lid gradually being closed by the engagement of the roller means with the engagement part of the lid as said second case moves from the first position to the second position.

5. An optical disk driver comprising:

a first case, accommodated in a housing which includes therein an operational processor operatively connected to said first case, said housing having a mouth via which said first case is inserted into the housing and ejected therefrom, said first case including an insertion opening having a shape corresponding to the mouth, there being an aperture between the first case and the mouth;

a second case, movable from a first position to a second position, said second case projecting from the first case so that an optical disk can be inserted and ejected via a top surface of said second case when said second case is located at the first position, said second case being operatively connected to the operational processor, via said first case, when said second case is located at the second position, said second case being inserted into said first case and projected therefrom via the insertion opening of said first case, said second case comprising a lid at the top surface thereof, the lid opening when said second case is located at the first position so that the optical disk can be inserted into said second case and ejected therefrom, and the lid being closed when said second case is located at the second position;

driving means for driving the optical disk inserted into said second case; and closing means operable when said second case is moved from the first position to the second position with the lid open, said closing means closing the lid softly in synchronization with the movement of said second case, wherein said first case comprises:

a pair of positioning members, oppositely located around the insertion opening, which are respectively inserted into a part of the aperture in order to position the insertion opening of the first case at substantially the center of the mouth when said first case is inserted into the housing, and fixing means for removably fixing the second case in the first case when the second case is located at the second position, and wherein said closing means further comprises:

a bearing located in the vicinity of the insertion opening; and an engagement part engagable with the bearing, provided on the lid, the lid gradually being closed by the engagement of the bearing with the engagement part of the lid as said second case is moved from the first position to the second position.

6. An optical disk driver comprising:

first case, accommodated in a housing which includes therein an operational processor operatively connected to said first case, said housing having a mouth via which said first case is inserted into the housing and ejected therefrom, said first case including an insertion opening having a shape corresponding to the mouth, an aperture existing between the first case and the mouth;

a second case, movable from a first position to a second position, said second case projecting from the first case so that an optical disk can be inserted and ejected via a top surface of said second case when said second case is located at the first position, said second case being operatively connected to the operational processor via said first case when said second case is located at the second position, and said second case being inserted into said first case and projected therefrom via the insertion opening of said first case; and driving means for driving the optical disk inserted into said second case, wherein said first case comprises:

a pair of positioning members, oppositely located around the insertion opening, which are respectively inserted into a part of the aperture to position the insertion opening of the first case at substantially the center of the mouth when said first case is inserted into the housing, and fixing means for removably fixing the second case in the first case when the second case is located at the second position, and wherein said second case comprises a lid openable and closeable at the top surface of said second case, the lid opening when said second case is located at the first position so that the optical disk can be inserted into said second case and ejected therefrom, and the lid being closed when said second case is located at the second position.

7. An optical disk driver according to claim 6, wherein said fixing means comprises a magnet provided in said first case, which magnet magnetically fixes said second case when the second case is located at the second position.

8. An optical disk driver according to claim 7, wherein said first case further comprises a latch mechanism operatively connected to the magnet, the magnet being released from being fixed by the latch mechanism when said second case is pushed from the first direction to the second direction so that said second case can be moved from the second position to the first position.

9. An optical disk drive according to claim 6, wherein the mouth and the insertion opening respectively have rectangular shapes, and wherein the positioning members have identical square pillar shapes, and are located adjacent to a first side of the insertion opening and a second side thereof opposite to the first side.

*10. An optical disk driver comprising:*

*a first case accommodated in a housing which includes therein an operational processor operatively connected to said first case, said housing having a mouth via which said first case is inserted into the housing and removed therefrom, said first case including an insertion opening having a shape corresponding to the mouth, an aperture existing between the insertion opening and the mouth;*

*a second case, movable between a first position and a second position, said second case projecting from the first case so that an optical disk can be inserted and ejected via a top surface of said second case when said second case is located at the first position, said second case being operatively connected to the operational processor via said first case when said second case is located at the second position, and said second case being inserted into said first case and projected therefrom via the insertion opening of said first case; and*

*driving means for driving the optical disk inserted into said second case, wherein said first case comprises: a pair of positioning members provided oppositely around the first case, which are respectively inserted into a part of the aperture to position the insertion opening of the first case at substantially the center of the mouth when said first case is inserted into the housing, and*

*fixing means for removably fixing the second case in the first case when the second case is located at the second position, and wherein said second case comprises a lid openable and closeable at the top surface of said second case, the lid opening when said second case is located at the first position so that the optical disk can be inserted into said second case and ejected therefrom, and the lid being closed when said second case is located at the second position.*

*11. An optical disk driver comprising:*

*a first case accommodated in a housing which includes therein an operational processor operatively connected to said first case, said housing having a mouth via which said first case is inserted into the housing and removed therefrom, said first case including an insertion opening having a shape corresponding to the mouth, an aperture existing between the insertion opening and the mouth;*

*a second case, movable between a first position and a second position, said second case projecting from the first case so that an optical disk can be inserted and ejected via a top surface of said second case when said second case is located at the first position, said second case being operatively connected to the operational processor via said first case when said second case is located at the second position, and said second case being inserted into said first case and projected therefrom via the insertion opening of said first case; and*

*driving means for driving the optical disk inserted into said second case, wherein said first case comprises:*

*a pair of positioning members provided oppositely around the first case which are respectively inserted into a part of the aperture to position the insertion opening of the first case at substantially the center of the mouth when said first case is inserted into the housing, and*

*fixing means for removably fixing the second case in the first case when the second case is located at the second position, and wherein said second case comprises a disk holding means such that the optical disk is held by*

*the disk holding means in the first position of the second case so that the optical disk can be inserted into said second case and removed therefrom.*

*12. An optical disk driver comprising:*

*a first case accommodated in a housing which includes therein an operational processor operatively connected to said first case, said housing having a mouth via which said first case is inserted into the housing and removed therefrom, said first case including an insertion opening having a shape corresponding to the mouth, an aperture existing between the insertion opening and the mouth;*

*a second case, movable between a first position and a second position, said second case projecting from the first case so that an optical disk can be inserted and ejected via a top surface of said second case when said second case is located at the first position, said second case being operatively connected to the operational processor via said first case when said second case is located at the second position, and said second case being inserted into said first case and projected therefrom via the insertion opening of said first case; and*

*driving means for driving the optical disk inserted into said second case, wherein said first case comprises:*

*a pair of positioning members provided oppositely located around the first case, which are respectively inserted into a part of the aperture to position the insertion opening of the first case at substantially the center of the mouth when said first case is inserted into the housing, and*

*fixing means for removably fixing the second case in the first case when the second case is located at the second position, and wherein the second case comprises a disk holding means associated with the top surface of said second case, the disk holding means capable of receiving and maintaining the optical disk in a predetermined position when the second case is located at the first position such that the optical disk can be inserted into said second case and held by said disk holding means and then ejected therefrom by release of the disk holding means in the first position.*

*13. An optical disk driver comprising:*

*a first case accommodated in a housing which includes therein an operational processor operatively connected to said first case, said housing having a mouth via which said first case is inserted into the housing and removed therefrom, said first case including an insertion opening having a shape corresponding to the mouth, an aperture existing between the insertion opening and the mouth;*

*a second case, movable between a first position and a second position, said second case projecting from the first case so that an optical disk can be inserted and ejected via a top surface of said second case when said second case is located at the first position, said second case being operatively connected to the operational processor via said first case when said second case is located at the second position, and said second case being inserted into said first case and projected therefrom via the insertion opening of said first case; and*

*driving means for driving the optical disk inserted into said second case, wherein said insertion opening comprises:*

*a pair of positioning members provided oppositely around the first case, which are respectively inserted into a part of the aperture to position the insertion opening of the first case at substantially the center of the mouth when said first case is inserted into the housing, and*

*fixing means for removably fixing the second case in the first case when the second case is located at the second position, and*

*a disk holding means associated with the top surface of said second case wherein said disk holding means holds the optical disk in a fixed position when said second case is in the first position and allows the optical disk to be moved from the first position to the second position without interference from the first case.*

*14. An optical disk driver comprising:*

*a first case accommodated in a housing which includes therein an operational processor operatively connected to said first case, said housing having a mouth via which said first case is inserted into the housing and removed therefrom, said first case including an insertion opening having a shape corresponding to the mouth, an aperture existing between the first case and the mouth;*

*a second case, movable from a first position to a second position, said second case projecting from the first case so that an optical disk can be inserted and ejected via a top surface of said second case when said second case is located at the first position, said second case being operatively connected to the operational processor via said first case when said second case is located at the second position, and said second case being inserted into said first case and projected therefrom via the insertion opening of said first case; and*

*driving means for driving the optical disk inserted into said second case, wherein said first case comprises:*

*a pair of positioning members, oppositely located around the insertion opening, which are respectively inserted into a part of the aperture to position the insertion opening of the first case at substantially the center of the mouth when said first case is inserted into the housing, and*

*fixing means for removably fixing the second case in the first case when the second case is located at the second position, and wherein said second case comprises a lid openable and closeable at the top surface of said second case, the lid opening when said second case is located at the first position so that the optical disk can be inserted into said second case and ejected therefrom, and the lid being closed when said second case is located at the second position wherein the openable position of the lid defines a location of the second case that provides access to position the disk on the second case and the closeable position of the lid defines a location of the second case in which the disk is inaccessible to prevent removal of the optical disk from the second case.*

*15. An optical disk driver comprising:*

*a first case accommodated in a housing which includes therein an operational processor operatively connected to said first case, said housing having a mouth via which said first case is inserted into the housing and removed therefrom, said first case including an insertion opening having a shape corresponding to the mouth, an aperture existing between the insertion opening and the mouth;*

*a second case, movable between a first position and a second position, said second case projecting from the first case so that an optical disk can be inserted and ejected via a top surface of said second case when said*

*second case is located at the first position, said second case being operatively connected to the operational processor via said first case when said second case is located at the second position, and said second case being inserted into said first case and projected therefrom via the insertion opening of said first case; and*

*driving means for driving the optical disk inserted into said second case, wherein said first case comprises:*

*a pair of positioning members provided oppositely around the first case, which are respectively inserted into a part of the aperture to position the insertion opening of the first case at substantially the center of the mouth when said first case is inserted into the housing, and*

*fixing means for removably fixing the second case in the first case when the second case is located at the second position, and wherein said second case comprises a disk holding means provided on a top surface of said second case so as to be movable between a first position and a second position, in which the disk holding means is moved from the first position to the second position when the optical disk is held by the disk holding means at the first position of the second case, and the disk holding means holding the optical disk is being kept in its first position when the second case is located at the second position thereof.*

*16. An optical disk driver comprising:*

*a first case accommodated in a housing which includes therein an operational processor operatively connected to said first case, said housing having a mouth via which said first case is inserted into the housing and removed therefrom, said first case including an insertion opening having a shape corresponding to the mouth, an aperture existing between the insertion opening and the mouth;*

*a second case, movable between a first position and a second position, said second case projecting from the first case so that an optical disk can be inserted and ejected via a top surface of said second case when said second case is located at the first position, said second case being operatively connected to the operational processor via said first case when said second case is located at the second position, and said second cage being inserted into said first case and projected therefrom via the insertion opening of said first case; and*

*driving means for driving the optical disk inserted into said second case, wherein said first case comprises:*

*a pair of positioning members provided oppositely around the first case, which are respectively inserted into a part of the aperture to position the insertion opening of the first case at substantially the center of the mouth when said first case is inserted into the housing, and*

*fixing means for removably fixing the second case in the first case when the second case is located at the second position, and wherein said second case comprises a disk holding means movable between a first position and a second position in which the disk holding means is adapted to be moved from the first position to the second position for holding the inserted optical disk at the first position of the second case, and the disk holding means is adapted to be moved from the second position to the first position for removing or ejecting the optical disk at the first position of the second case, and wherein the disk holding means holding the optical disk is being kept in its first position when the second case is located at the second position thereof.*

* * * * *